J. B. MILLER.
LOCK FOR MILK BOXES.
APPLICATION FILED MAR. 15, 1919.
1,334,777.
Patented Mar. 23, 1920.
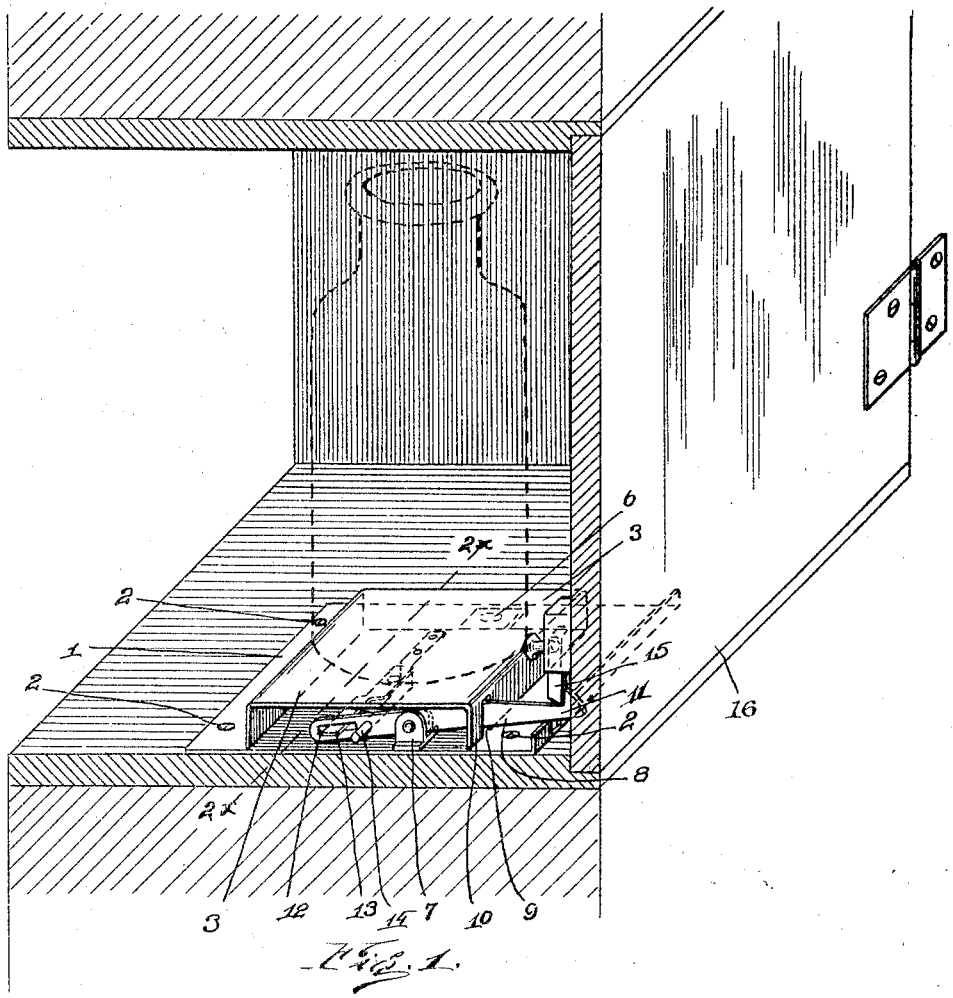
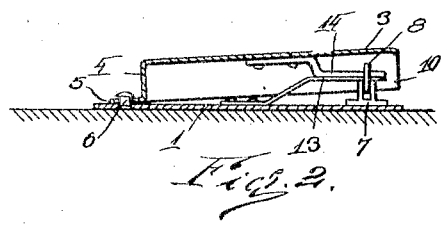
Witness
Inventor
JOSEPH B. MILLER
By Frank Keifer
Attorney

UNITED STATES PATENT OFFICE.

JOSEPH B. MILLER, OF ROCHESTER, NEW YORK, ASSIGNOR OF ONE-HALF TO JOHN A. HAROLD, OF ROCHESTER, NEW YORK.

LOCK FOR MILK-BOXES.

1,334,777.

Specification of Letters Patent.   Patented Mar. 23, 1920.

Application filed March 15, 1919.   Serial No. 282,957.

*To all whom it may concern:*

Be it known that I, JOSEPH B. MILLER, a citizen of the United States, residing at Rochester, in the county of Monroe and State of New York, have invented certain new and useful Improvements in Locks for Milk-Boxes, of which the following is a specification.

The object of this invention is to provide a new and improved form of lock for milk boxes, which operates to automatically lock the outside door of the box on the closing of the door after a full milk bottle has been inserted in the box.

Another object of this invention is to make this lock adaptable to any of the milk boxes now in use.

This and other objects of this invention will be fully illustrated in the drawings, described in the specification and pointed out in the claims at the end thereof.

In the accompanying drawings:

Figure 1 is a perspective view of the milk box with the locking mechanism attached thereto.

Fig. 2 is a section through the locking mechanism, the section being taken on the line 2×—2× of Fig. 1.

In the several figures of the drawing, like reference numerals indicate like parts.

As shown in Fig. 1, the locking device comprises the base plate 1 which is suitably fastened to the bottom of the milk box by means of the screw 2. Mounted to rock on the base plate 1 is the platform 3 which comprises a sheet metal plate having flanges formed on three sides thereof, which flanges rest on the base plate and support the platform. The flange 4 has an extension 5 provided thereon at right angles thereto and has a pin 6 passing therethrough on which the platform 3 is mounted to rock.

The pin is suitably fastened to the base plate 1. Also fastened to the base plate 1 below the platform 3 is the bearing block 7. A locking lever 8 is mounted to swing in this bearing block. This locking lever projects through the slot 9 provided in the flange 10 of the platform and has the hook 11 formed on the outer end thereof. The inner end of the lever 8 has a slot 12 provided therein through which the outer end of the leaf spring 13 is adapted to pass. The leaf spring 13 is fastened to the base plate 1 as shown in Fig. 2. Fastened to the underside of the platform 3 is the pin 14 which is offset on the outer end and projects through a suitable opening in the side of the lever 8.

The action of the leaf spring 13 is to force the left-hand side of the lever 8 upwardly so as to lift the platform 3 through the pin 14, while at the same time the right-hand end of the lever 8 with its hook 11 is forced down. When in this position the spring catch 15 mounted on the inside of the door 16 of the milk box cannot engage the hook of the lever 8 so that when the door is shut it will not lock from the inside, thereby permitting the door to be reopened from the outside. When a full milk bottle is placed on the platform 3 it rocks the platform on its pivot pin 6 and forces the platform from the position shown in Fig. 2 to that shown in Fig. 1. In this position the left-hand side of the lever is forced down by the platform through the pin 14 which in turn raises the right-hand end of the lever 8. The hook 11 formed on this end of the lever is thus placed in line with the spring catch 15 on the door, with which it will make engagement to hold the door locked as soon as it is closed. To unlock the door the bottle placed on the platform must be removed from the inside. This permits the spring 13 to raise the platform and move the lever out of engagement with the spring latch of the door.

As shown in Fig. 1, the locking mechanism occupies but a small portion of the floor space of the box and only one bottle of milk is necessary to operate the locking lever. This arrangement permits any number of milk bottles to be placed in the box by the milkman and locked therein by the closing of the door from the outside. The empty bottles which are collected by the milkman are placed in the box from the inside and will not lock the outside door of the box as long as none of the bottles are placed on the platform. In this manner the outside door of the milk box may be left unlocked so that it can be opened by the milkman to take out the empty bottles, but as soon as he has placed a full bottle on the platform and has closed the door, the door cannot be reopened until the bottle has been taken off of the platform from the inside of the box.

The lock provided in this manner prevents the reopening of the milk box from the outside after the full milk bottles have been placed therein and thus prevents the taking of the bottles by unauthorized persons.

I claim:

1. A lock for a milk box comprising a base plate being adapted to be permanently fastened to the bottom of a milk box, a small platform mounted thereon, a pin carried on the under side of said platform, a latch pivotally mounted on said base having its inner end engaged with said pin carried on said platform and its outer end in position to engage a catch on the door, a spring mounted on said base normally lifting said platform and the inner end of said latch, said spring and platform being depressed by the weight of a milk bottle resting thereon, thereby lifting the outer end of said latch into position to engage said catch on the door, said platform having room thereon for but one milk bottle.

2. A lock for a milk box comprising a base plate being adapted to be permanently fastened to the bottom of a milk box, a small platform mounted thereon, a pin carried on the under side of said platform, a latch pivotally mounted on said base having its inner end engaged with said pin carried on said platform and its outer end in position to engage a catch on the door, a spring mounted on said base normally lifting the said platform and the inner end of said latch, said spring and platform being depressed by the weight of a milk bottle resting thereon, thereby lifting the outer end of said latch into position to engage said catch on the door, said platform having flanges thereon that rest on the base and firmly support the platform when loaded.

In testimony whereof I affix my signature.

JOSEPH B. MILLER.